US006235250B1

(12) United States Patent
Ohkawa

(10) Patent No.: US 6,235,250 B1
(45) Date of Patent: May 22, 2001

(54) NUCLEAR WASTE SEPARATOR

(75) Inventor: Tihiro Ohkawa, La Jolla, CA (US)

(73) Assignee: Archimedes Technology Group, Inc., San Diego, CA (US)

(*) Notice: Subject to any disclaimer, the term of this patent is extended or adjusted under 35 U.S.C. 154(b) by 0 days.

(21) Appl. No.: 09/409,311

(22) Filed: Sep. 29, 1999

Related U.S. Application Data

(63) Continuation of application No. 09/275,699, filed on Mar. 24, 1999, now Pat. No. 6,203,669, and a division of application No. 08/970,548, filed on Nov. 14, 1997, now Pat. No. 5,939,029.

(51) Int. Cl.[7] ..................... B01J 19/08

(52) U.S. Cl. ..................... 422/186

(58) Field of Search ..................... 422/186; 204/156

(56) References Cited

U.S. PATENT DOCUMENTS

| | | | |
|---|---|---|---|
| 3,722,677 | 3/1973 | Lehnert . | |
| 3,780,309 | 12/1973 | Bochard . | |
| 3,845,315 | 10/1974 | Blum . | |
| 3,962,587 | 6/1976 | Dufrane et al. . | |
| 4,637,545 | 1/1987 | Stewart . | |
| 4,987,007 | 1/1991 | Wagal et al. . | |
| 5,225,740 | 7/1993 | Ohkawa . | |
| 5,350,454 | 9/1994 | Ohkawa . | |
| 5,478,608 | 12/1995 | Gorokhovsky . | |
| 5,653,854 * | 8/1997 | Miyamoto et al. | 204/156 |
| 5,681,434 | 10/1997 | Eastlund . | |

FOREIGN PATENT DOCUMENTS

| | | |
|---|---|---|
| WO 97/05630 | 2/1997 | (WO) . |
| WO 97/34684 | 9/1997 | (WO) . |
| WO 97/34685 | 9/1997 | (WO) . |
| WO 98/37948 | 9/1998 | (WO) . |
| WO 99/37590 | 7/1999 | (WO) . |

* cited by examiner

*Primary Examiner*—Kishor Mayekar
(74) *Attorney, Agent, or Firm*—Nydegger & Associates

(57) ABSTRACT

A method and system for separating radioactive waste containing volatiles, into light ions and heavy ions, includes a loader/transporter for transferring the waste into a high vacuum environment in the chamber of a plasma processor. During this transfer, gases of the volatiles are released from the waste, collected in a holding tank, and subsequently ionized in the chamber. As the volatiles are ionized, the ions are directed by a magnetic field into contact with the waste to vaporize the waste. The waste vapors are then ionized in the plasma processor chamber to create a multi-species plasma which includes electrons, light ions and heavy ions. Within the chamber, the density of the multi-species plasma is established to be above its collision density in order to establish a substantially uniform velocity for all ions in the plasma. A nozzle accelerates the multi-species plasma to generate a fluid stream which is directed from the chamber toward an inertial separator. A magnetic field in the inertial separator effectively blocks electrons in the stream from entering the separator. On the other hand, the inertia of the various ions in the stream carry them into the separator where they are segregated into light ions and heavy ions according to their atomic weights. After segregation, the heavy ions are vitrified for subsequent disposal.

15 Claims, 5 Drawing Sheets

NUCLEAR WASTE SEPARATOR

CROSS REFERENCE TO RELATED PATENT APPLICATION AND U.S. PATENT

This application is a continuation of application Ser. No. 09/275,699, filed Mar. 24, 1999, now U.S. Pat. No. 6,203,669. Application Ser. No. 09/275,699, is a divisional of Application Ser. No. 08/970,548 filed Nov. 14, 1997 now U.S. Pat. No. 5,939,029, issued on Aug. 17, 1999. The contents of application Ser. No. 09/275,699, and U.S. Pat. No. 5,939,029, are incorporated herein by reference.

FIELD OF THE INVENTION

The present invention pertains generally to systems and methods for the remediation of nuclear waste. More particularly, the present invention pertains to systems and methods which segregate nuclear waste into high level radioactive waste, low level radioactive waste and non-radioactive waste for separate handling and an appropriate disposal for the particular level of radioactivity. The present invention is particularly, but not exclusively, useful as a system and method for separating nuclear waste atom by atom.

BACKGROUND OF THE INVENTION

There is almost universal agreement that nuclear waste presents a global problem of immense proportions. Nevertheless, despite this awareness, the exact extent and possible ramifications of the problem are still somewhat undefined and are not fully appreciated by the public. All agree, however, that something must be done. The problem is further complicated by the fact that, heretofore, there has been no completely acceptable solution for the disposal of nuclear waste. Stated differently, the costs and the risks involved are generally unacceptable. Using conventional technology, the costs for remediation of the nuclear waste in this country alone is astronomical.

At the present time, nuclear waste is being temporarily stored in hundreds, and possibly thousands, of containers at various sites throughout the world. The total bulk of this nuclear waste is easily appreciated when it is realized that one container alone may hold as much as one million gallons of nuclear waste. Clearly, the volume of nuclear waste which requires special disposal is enormous. The problem is further complicated by the fact that a significant portion of the nuclear waste is classified as high level waste which requires special handling and extraordinary safeguards.

One form of disposal for nuclear waste which has gained some degree of acceptance in the nuclear waste remediation community involves a process known as vitrification, or glassification. In a vitrification process, the nuclear waste is absorbed and incorporated into glass for subsequent disposal. Present day vitrification techniques, however, face at least two significant difficulties. Most importantly, under present practice there is no effective way to differentiate between high level waste, which requires special handling, and low level waste which can be disposed of in a more conventional manner. Consequently, whenever high level waste is involved, the entire volume of nuclear waste, including both high level and low level waste, is treated the same way. As indicated above, the total volume of this waste is significant. Second, due to the large volume of waste that must be handled as high level waste, treatment and disposal may require decades to accomplish.

It happens that of the entire volume of nuclear waste, only about 0.001% are the radionuclides which make the waste radioactive. As recognized by the present invention, if the radionuclides can somehow be segregated from the non-radioactive ingredients of the nuclear waste, the handling and disposal of the radioactive components could be greatly simplified.

In light of the above it is an object of the present invention to provide a system and method for nuclear waste remediation which separates and segregates the radionuclides from the non-radioactive elements in the waste. Another object of the present invention is to provide a system and method for nuclear waste remediation which effectively vitrifies high concentrations of radionuclides for subsequent disposal. Still another object of the present invention is to provide a system and method for nuclear waste remediation which uses an in-line continuous process that requires minimal material manipulation. Yet another object of the present invention is to provide a system and method for nuclear waste remediation which is relatively easy to manufacture, simple to use and comparatively cost effective.

SUMMARY OF THE PREFERRED EMBODIMENTS

A system and method for extracting radionuclides from radioactive waste relies on the general notion that radionuclides in the waste are elements which have relatively high atomic weights (e.g. $A \geqq 70$). Based on this premise, in accordance with the present invention, radioactive waste is first vaporized and then ionized to create a multi-species plasma. Due to the fact that the ingredients of the nuclear waste may not be known, it is considered that the resultant multi-species plasma will include electrons, light ions (e.g. $A<70$) and heavy ions (e.g. $A \geqq 70$). The multi-species plasma is then accelerated to create a fluid stream in which the light ions and heavy ions all have substantially the same velocity. Once the uniform velocity fluid stream is created, particles in the stream are decelerated and segregated according to their respective inertia. The segregated heavy ions are then collected and vitrified for subsequent disposal. The specifics of the processes involved in the present invention are best appreciated by considering the various system components.

In overview, the present invention is an in-line system for the continuous processing of radioactive waste which sequentially comprises a loader/transporter, a plasma processor, a nozzle, an inertial separator and a collector/disposer sub-system. For the present invention, in accordance with well known practices, the vaporization and ionization of the radioactive waste are accomplished in the plasma processor in a high vacuum environment. This high vacuum environment (i.e. very low pressure environment) is in the range of a few microbars (e.g. 2–5 $\mu$bar). To begin the process, the transfer of radioactive waste into the high vacuum environment of the plasma processor is accomplished by the loader/transporter section of the system.

The loader/transporter section of the system for the present invention includes a substantially hollow U-shaped tube. Specifically, one end of the U-shaped tube (the first end) is exposed to atmospheric conditions while the other end (the second end) is exposed to the high vacuum environment of the plasma processor. Further, the tube itself is filled with a liquid transport medium, such as Octoil, which makes the assembly function like a manometer. In operation, a canister of radioactive waste is lowered through an opening at the first end of the tube and into the transport medium. The canister is then passed down the leg of the tube (the first leg) in the transport medium. Next, the canister is transferred through the transport medium across the base portion of the U-shaped tube by a series of rollers. After traveling across the base portion, an elevator raises the canister up through the other leg (the second leg) of the U-shaped tube. This raising action by the elevator lifts the waste filled canister out of the transport medium, and into the high vacuum environment. The canister is then transferred through a chute on a series of rollers which places it into position for subsequent processing in the plasma processor. Additionally, during transfer of the radioactive waste canister through the loader/transporter section of the system, the canister can be perforated by a punch. This punching action releases gases of the volatile materials that are in the waste (hereinafter generally referred to as "volatiles") and allows them to be collected and held in a volatile holding tank for subsequent use in the plasma processor.

The plasma processor of the present invention is essentially a hollow tube which has two open ends. One of these ends is connected in fluid communication with the chute of the loader/transporter, and another end is connected in fluid communication with the nozzle. Between the chute and the nozzle, a portion of the plasma processor tube is established as a plasma chamber which includes a substantially cylindrical shaped dielectric section that is positioned between two stainless steel cylinders. A radio-frequency (rf) antenna is positioned around the dielectric section of the plasma chamber, and a solenoid magnet is positioned around both the rf antenna and the plasma processor along the entire length of the plasma processor tube. As intended for the present invention, the solenoid magnet establishes an axially oriented magnetic field in the plasma processor tube which extends through the plasma processor and has a field strength of approximately one tenth of a Tesla (≈0.1 T).

In the operation of the plasma processor, a vacuum is drawn to establish the high vacuum environment in the plasma processor. As indicated above, this high vacuum environment has a pressure of only a few μbars. The rf antenna is then activated with a frequency that is approximately in the range of two to twenty MegaHerz (2–20 MHz) and which has a power of approximately 7 Megawatts (7 MW). With the rf antenna activated, volatiles from the holding tank are released into the plasma chamber where they are A ionized by radiation from the rf antenna. The resultant volatile ions move along the magnetic field lines that are generated by the solenoid magnet and are, thereby, directed into contact with the waste canister. Recall, the waste canister was previously moved through the chute of the loader/transporter and into position at one end of the plasma processor tube. When it contacts the waste canister, the heat of the plasma effectively vaporizes the canister and its waste contents. The resultant waste vapors then migrate back into the plasma chamber where they too are ionized. This creates a multi-species plasma which includes electrons (negative ions), and positive ions of all the elements that were in the waste. While it is to be recognized there will be as many types of positive ions as there were elements in the waste, it is convenient for the disclosure of the present invention to generally categorize the positive ions according to their atomic weight as being either "light ions" or "heavy ions". For purposes of discussion, it will be considered that the demarcation between light ions and heavy ions will be around an atomic weight of seventy. This, of course, is only for purposes of disclosure and, in actual practice, may be varied as necessary.

When a density is attained at which the ions in the multi-species plasma are collisional in the plasma chamber (hereinafter referred as the "collisional density"), the nozzle is activated to begin accelerating the particles of the multi-species plasma into a fluid stream. It is important to note that, due to the collisional density of the multi-species plasma, all of the positive ion particles in the fluid stream (light ions as well as heavy ions) will have substantially the same velocity. Structurally the nozzle, like the plasma processor, is essentially a hollow tube. More specifically, there is a tapered, funnel-shaped, portion of the nozzle which is connected to the plasma processor and which is flared outwardly from the plasma processor in the down stream direction. With this flare, there is an expansion and resultant acceleration of the multi-species plasma as the plasma exits from the plasma processor through the nozzle. As it leaves the nozzle, the fluid stream of plasma particles is directed toward the inertial separator.

The inertial separator in the system of the present invention includes a pair of opposed substantially parallel metallic walls, and a pair of opposed substantially parallel non-conducting walls. These walls are all interconnected to establish a generally square shaped channel. One end of the channel is closed over with a non-conducting face plate, and the open end of the channel, the end which is opposite the face plate, is oriented to receive the accelerated fluid stream from the plasma processor into the channel. A variable resistive element is connected between the parallel metallic walls of the separator and a magnetic field is established in the channel which is generally parallel to the metallic walls and perpendicular to the direction of the fluid stream as it exits the nozzle from the plasma processor. A plurality of baffles (at least two) are formed into one of the non-conducting walls of the separator and are aligned in a direction which extends from the open end of the channel toward the face plate.

In operation, the fluid stream of the multi-species plasma is directed by the nozzle from the plasma processor into the channel of the inertial separator. As this stream enters the separator, the electrons in the stream are effectively blocked by the magnetic field in the channel from entering the channel. On the other hand, due to their inertia, the higher weight positive ions continue as a stream and enter the chamber. As the positive ions transit the chamber through the magnetic field, however, an electromotive force is generated which opposes the motion of the ions. This electromotive force, which can be controlled by the resistive element, decelerates the positive ions and causes them to drop from the stream. Importantly, depending on their respective atomic weight, the positive ions are decelerated at different rates. Specifically, the rate of deceleration is greater for the lighter ions and lesser for the heavier ions. Consequently, the lighter weight ions (light ions) drop from the stream first, while the heavier ions (heavy ions) are the last to drop. According to the arrangement of the baffles, ions of generally the same atomic weight can be collected in respective baffles and thereby segregated from ions of different atomic weight.

The final part of the system for the present invention includes a plurality of collector/disposer sub-systems which receive and process ions after they have been separated and segregated by the inertial separator. As intended for the present invention, each baffle in the inertial separator feeds ions to an associated collector/disposer sub-system. Thus, there may be as many collector/disposer sub-systems as there are baffles in the inertial separator. For purposes of discussion, however, only one such sub-system needs to be described. Specifically, consider the described sub-system as being the collector/disposer sub-system which processes the radioactive heavy ions.

Each collector/disposer sub-system of the present invention includes three separate and distinct components. While the general purpose of each component is to vitrify a portion of the ions that are collected through the associated baffle, each component functions somewhat differently. In general, the three components (vitrifiers) can be classified according to their operational pressures. The first component of the collector/disposer sub-system operates in the high vacuum environment of the system and includes a U-shaped manometer-like tube which is filled with molten glass. One end of the manometer tube is exposed to the atmosphere while the other end is connected directly with the baffle in the high vacuum environment. Accordingly, all of the ions which pass through the baffle are first exposed to the low pressure surface of the molten glass in the manometer structure. At this point in the process a vast majority of the radioactive heavy ions are vitrified. The vitrified heavy ions are then siphoned from the manometer and passed through a shot tower where they are converted into glass beads and collected in a bin for further disposal. The remainder of the ions, those which recombine into a gaseous phase rather than being absorbed into the molten glass and those which for whatever reason are not absorbed, are passed to the second component of the collector/disposer sub-system.

Unlike the first component of the collector/disposer sub-system, the second component operates at atmospheric pressure. It also, however, includes a tank of molten glass and essentially acts as a vitrifier like the first component. Further, an acoustic barrier assists with the vitrification process in this second component by removing particulates from the gas stream under the principles of the Oseen effect. As these particles are removed from the stream, they are deposited in the tank for absorption by the molten glass. Again, as was done in the first component, the vitrified ions are siphoned through a shot tower where they are converted into glass beads and collected in a bin for further disposal.

In the third component of the collector/disposer sub-system the gases which were not vitrified in the second component are pumped under elevated pressure and bubbled into a glass melt. The gases are thus trapped and transported out of the system in the glass melt. Periodically, in order to confine the heavy elements in identifiable portions of the glass melt, the heavy element gases are not bubbled into the glass melt. Thus, as the glass melt is cooled before exiting the system there are clear portions which do not include he heavy elements. The glass can then be cut at the clear portions to separate the waste into sizes which can be handled more easily.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
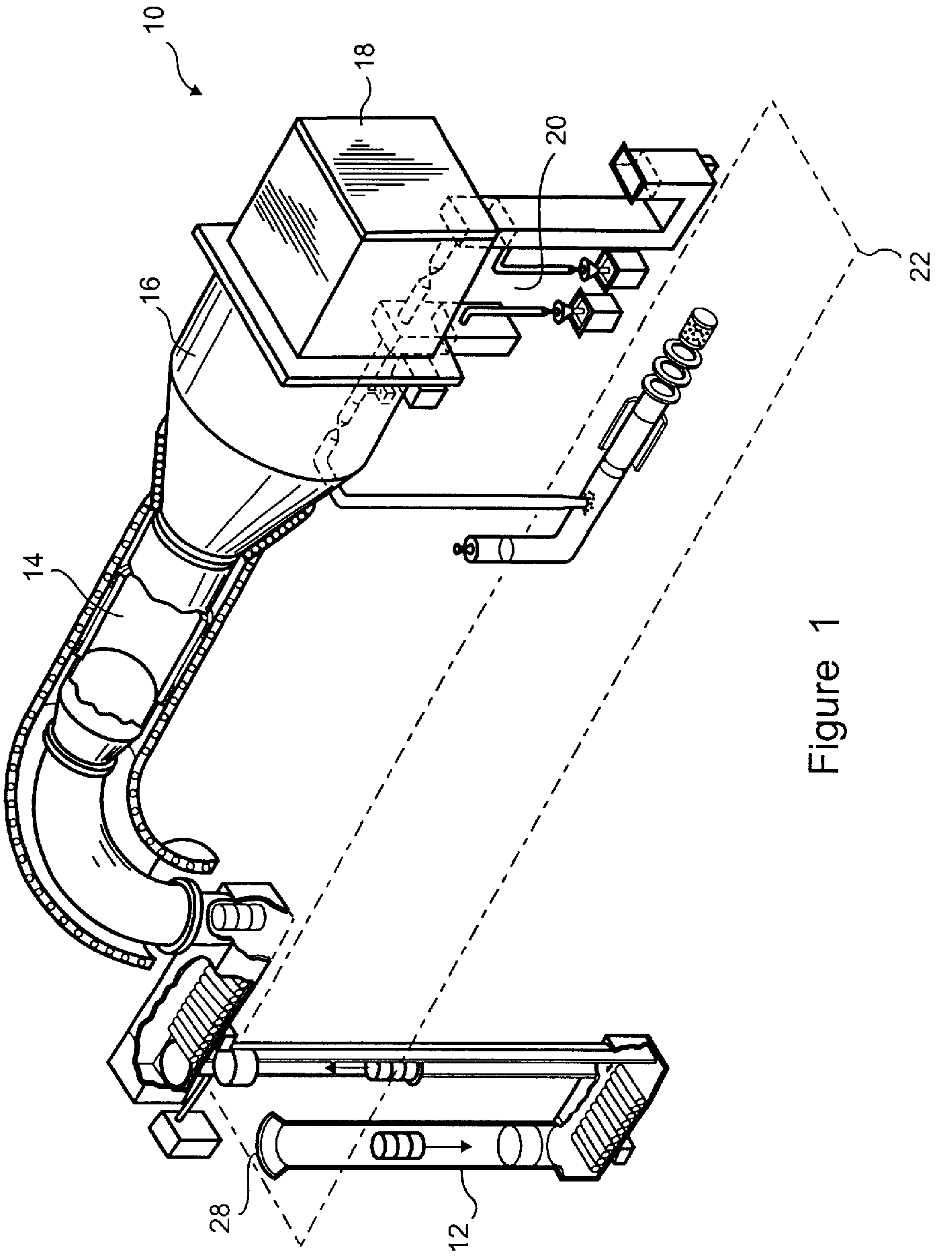
FIG. 1 is a perspective view of the system of the present invention showing the interconnection of the various system components with portions broken away and portions shown in phantom for clarity.
Figure 2:
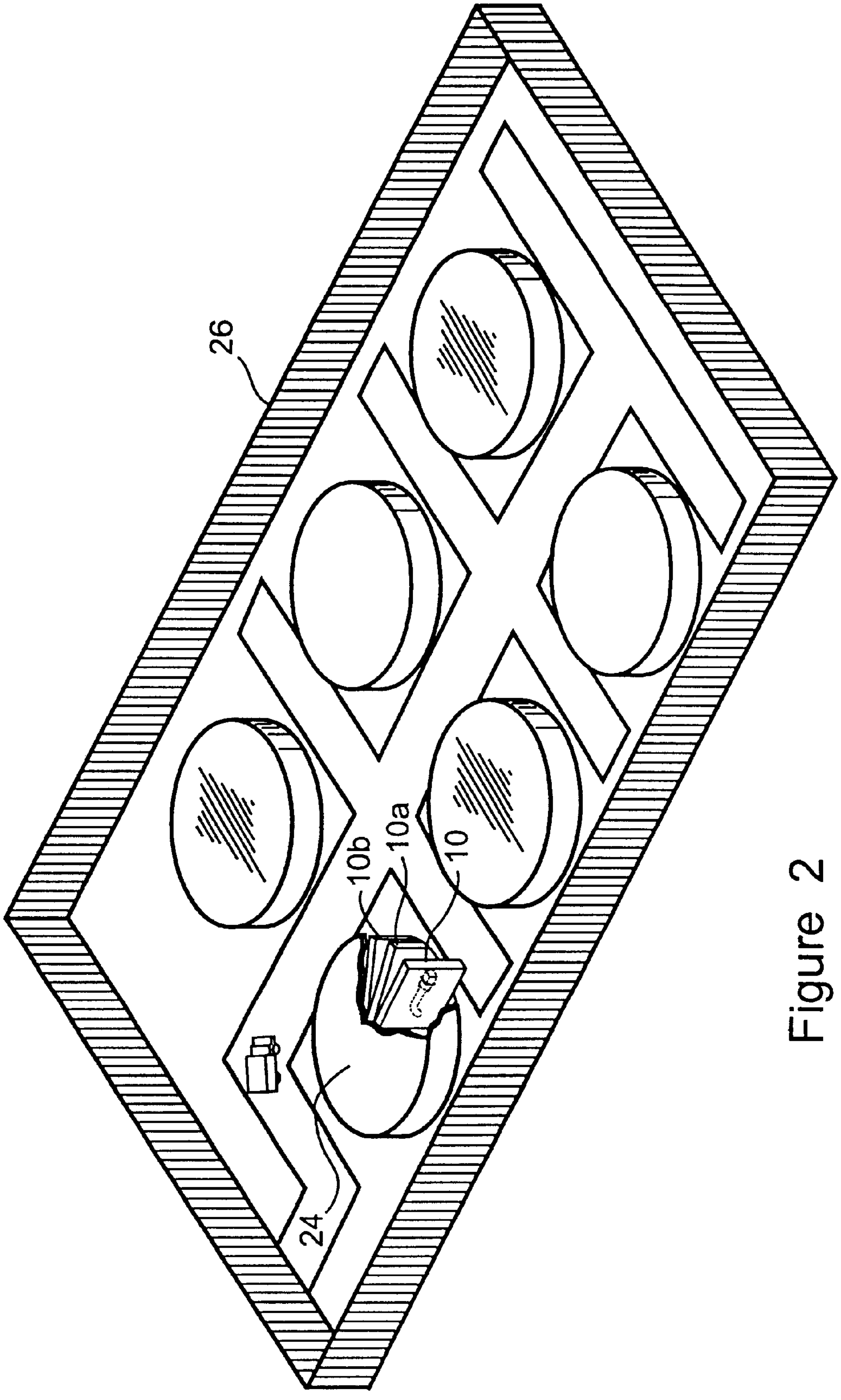
FIG. 2 is a perspective view of a battery of systems used for the disposal of radioactive waste in accordance with the present invention.

Referring initially to FIG. 1, a system module in accordance with the present invention is shown and generally designated 10. As shown, the system module 10 includes several components which are interconnected to establish an in-line continuous processing system. These components include a loader/transporter 12, a plasma processor 14, a magnetic nozzle 16, an inertial separator 18 and a collector/disposer 20. As a general indication of how the system module 10 might be employed, a possible location for ground level 22 is shown in FIG. 1. Accordingly, a portion of the system module 10 may be above ground level 22 and some of it may be below the ground level 22. Further, as shown in FIG. 2, a plurality of up to around ten system modules 10 may be clustered together in a pod 24 (the system modules 10, 10*a* and 10*b* shown in FIG. 1 are exemplary). Also, depending on the amount of waste remediation to be accomplished, several pods 24 may be co-located at a site facility 26.

Figure 3:
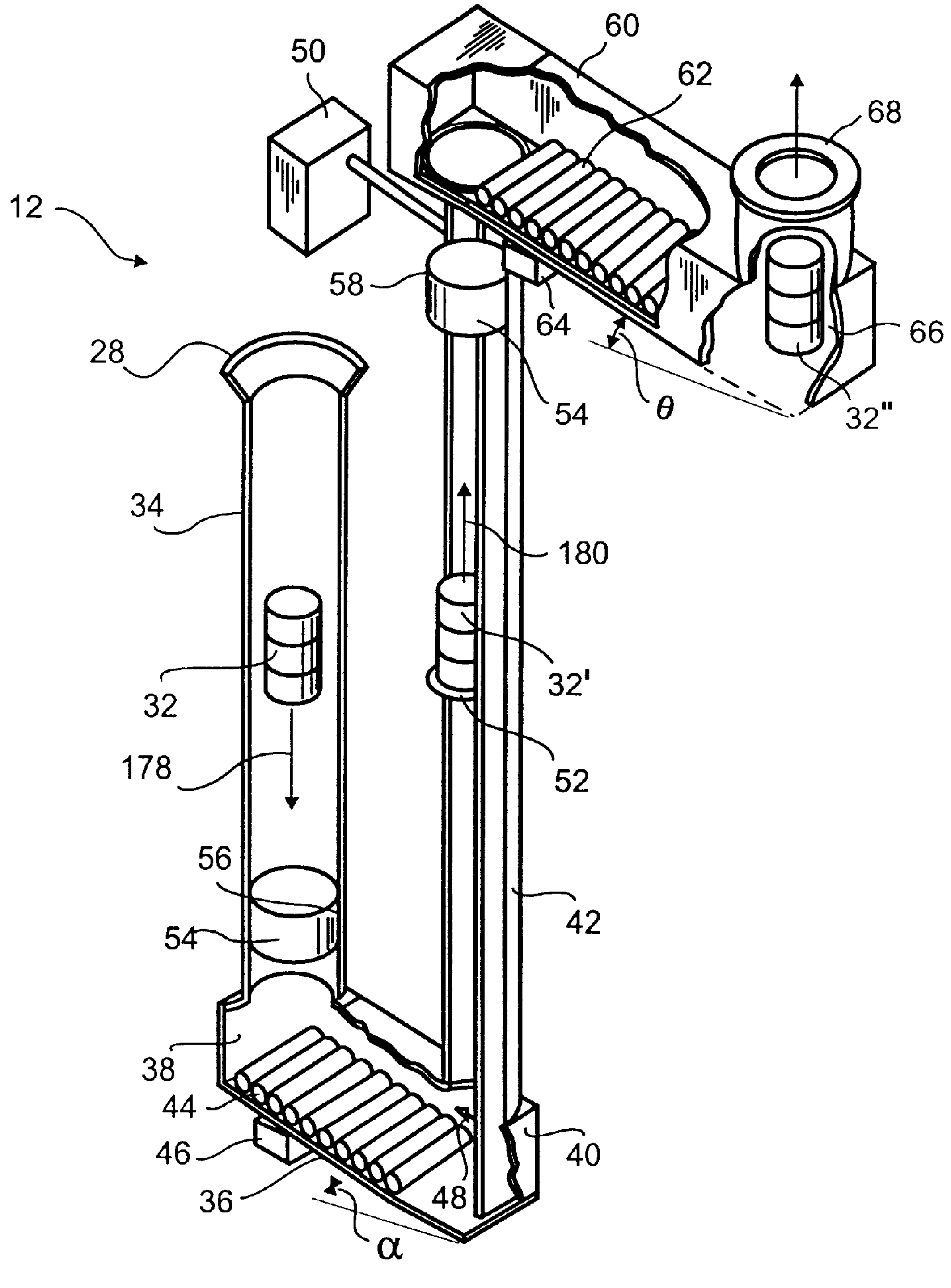
FIG. 3 is a perspective view of the loader/transporter of the system with portions broken away for clarity.

In FIG. 3 it is shown that the loader/transporter 12 has an entry vestibule 28 for receiving a canister 32 of nuclear waste. As expected for the present invention, the canister 32 will typically be a standard 50 gal. drum of a type well known in the industry. Further, as indicated previously, the actual contents or ingredients of the nuclear waste in canister 32 need not be known. In any case, the canister 32 is received through the entry vestibule 28 into a vertical leg 34 which is, most likely, underground and which has a generally circular cross section in order to accommodate the canister 32. The loader/transporter 12 also has a horizontal passageway 36 which has an end 38 that connects with the lower end of the vertical leg 34. Also, the other end 40 of the horizontal passageway 36 connects with the lower end of another vertical leg 42. Together, the vertical leg 34, horizontal passageway 36 and vertical leg 42 form a substantially U-shaped tube.

In more detail, the horizontal passageway 36 of loader/transporter 12 is substantially rectangular in cross section. This is done in order to avoid the need to tip canister 32, and thereby accommodate the canister 32 as it travels horizontally through the passageway 36. Additionally, in order to facilitate the transfer of the canister 32 through passageway 36, the floor of passageway 36 can include a plurality of stainless steel rollers 44, and the passageway 36 can be tilted at an angle a from the horizontal. Thus, canister 32 can effectively travel through the passageway 36 under the influence of gravity. However, in the event canister 32 becomes "hung up" in the passageway 36, a magnetic transport assist 46 is provided to help transfer the canister 32 through passageway 36 under the influence of a magnetic field.

It is also shown in FIG. 3 that the loader/transporter 12 includes a punch 48 which is located at or near the end 40 of horizontal passageway 36. The purpose of this punch 48 is to penetrate the canister 32, and to thereby release gases from any volatile materials that are contained in the canister 32 with the nuclear waste. As indicated above, the exact contents of the canister 32 is not necessarily known.

Therefore, an exact identification of the volatile materials which may be in canister 32 can not be made and, instead, a general reference to these materials as "volatiles" is deemed sufficient for purposes of this disclosure. In any event, as intended for the present invention, the volatile gases which are released from the canister 32 when it is punctured by the punch 48 are to be collected in a holding tank 50 for subsequent use.

FIG. 3 also shows that the vertical leg 42 of the loader/transporter 12 includes an elevator 52 which is intended to lift the canister 32 from the horizontal passageway 36. Further, FIG. 3 shows that the legs 34, 42 and horizontal passageway 36 of the loader/transporter 12 are each filled, at least to some extent, with a transport medium 54. In general the transport medium 54 can be any appropriate liquid which will act as a manometer for the purposes of the system 10. Preferably, however, the transport medium 54 is a low-vapor pressure oil that supports a high vacuum, such as Octoil, or its equivalent. For purposes of the present invention, the entry side surface 56 of transport medium 54 will be at atmospheric pressure, while the vacuum side surface 58 of transport medium 54 will be at a pressure of only a few microbars.

As indicated by FIG. 3, the canister 32' is lifted by elevator 52, through the transport medium 54 into a chute 60. With a construction similar to the horizontal passageway 36, the chute 60 is substantially rectangular in cross section. Also, the floor of the chute 60 includes stainless steel rollers 62 and is inclined at an angle θ to allow a transfer of the canister 32 through the chute 60 under the influence of gravity. Also like the horizontal passageway 36, the chute 60 is provided with a magnetic transport assist 64 in the event the canister 32 requires additional help in transiting the chute 60. After the canister 32 has been transferred through the loader/transporter 12, it is located at an insertion point 66 as shown for canister 32". At this point, it is to be appreciated by cross referencing FIG. 3 and FIG. 4, that the end 68 of loader/transporter 12 is sealed in fluid communication with the end 70 of the plasma processor 14.

Figure 4:
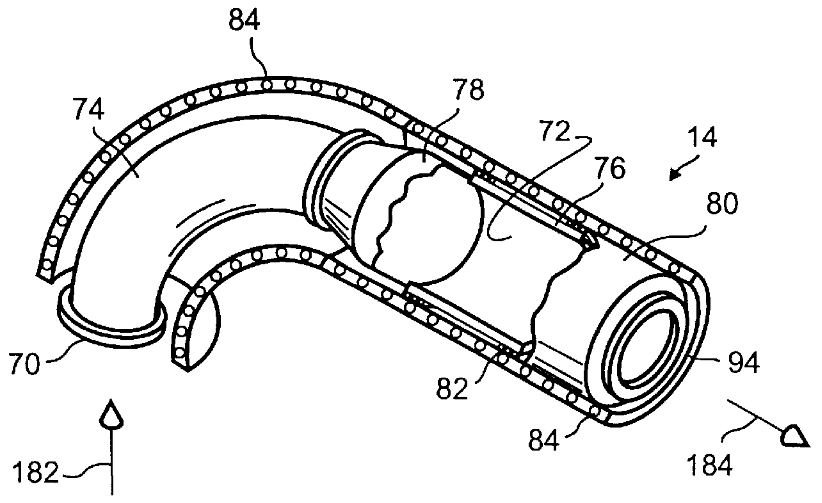
FIG. 4 is a perspective view of the plasma processor of the system with portions broken away for clarity.

The plasma processor 14, shown in FIG. 4, is generally formed as a hollow tube which includes a plasma chamber 72 and an elbow section 74. As shown, the elbow section 74 is the connection between the plasma chamber 72 and the insertion point 66 of the loader/transporter 12. In more detail, the plasma chamber 72 includes a central dielectric section 76 which is between and coaxially aligned with a stainless steel cylinder 78 and a stainless steel cylinder 80. Additionally, a radio frequency (rf) magnetic dipole antenna 82 is wound around the dielectric section 76, and a solenoid magnet 84 is mounted around both the plasma chamber 72 and elbow section 74 of the plasma processor 14. Preferably, the antenna 82 operates with approximately seven megawatts (7 MW) in a frequency range of approximately two to twenty megahertz (2–20 MHz). Also, preferably, the solenoid magnet 84 generates a magnetic field which is axially oriented along the plasma chamber 72 and elbow section 74 and which has a field strength somewhere in the range of approximately five hundredths to ten hundredths Tesla (0.05–0.1 T). An appropriate power supply as well as necessary cooling systems for operating the antenna 82 and solenoid magnet 84 can be provided in any manner well known in the pertinent art. Additionally, it is to be appreciated that a vacuum pump (not shown) of any type well known in the pertinent art can be operationally connected with the plasma processor 14 to establish and maintain a high vacuum of only a few microbars.

Figure 5:
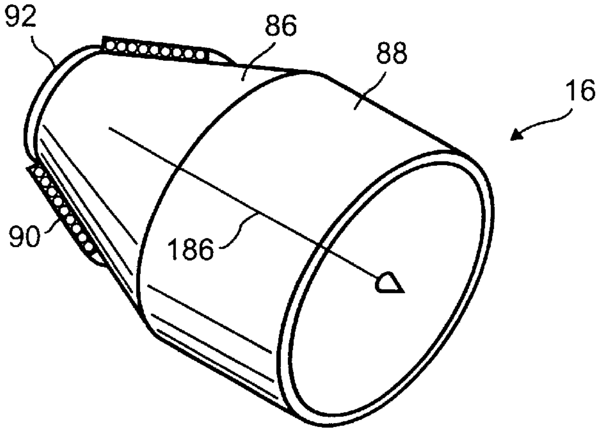
FIG. 5 is a perspective view of the nozzle of the system.

FIG. 5 shows the magnetic nozzle 16 of the system module 10. As shown, the nozzle 16 includes a tapered section 86 and a cylinder section 88. Additionally, a magnet coil 90 is mounted on the tapered section 86. As will be appreciated by cross reference between FIG. 5 and FIG. 1, the end 92 of nozzle 16 is attached in fluid communication with the end 94 of plasma processor 14. Within this construction, the tapered section 86 is of increasing cross sectional area in a direction away from the plasma processor 14.

Figure 6:
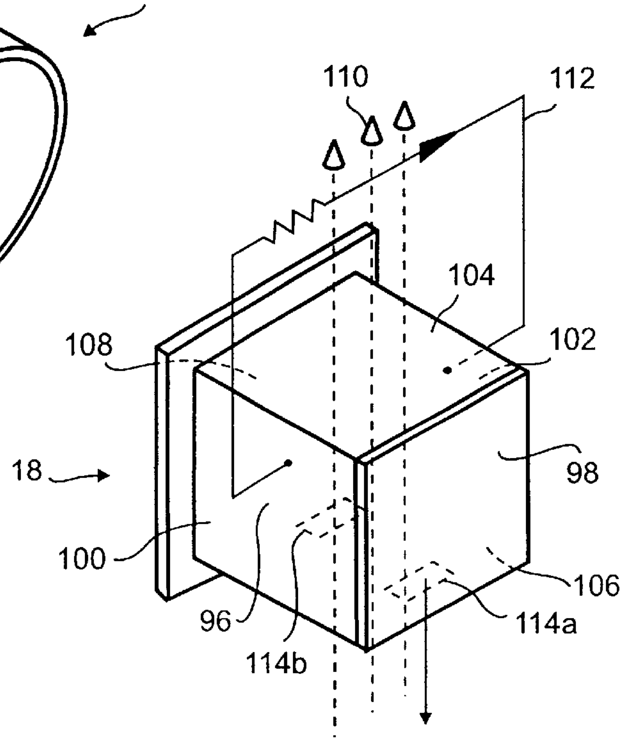
FIG. 6 is a perspective view of the inertial separator of the system with portions shown in phantom for clarity.

The inertial separator 18 of the system 10 is shown in FIG. 6 to be formed with a channel 96. More specifically, one end of the channel 96 is closed by a non-conducting face plate 98, while the channel 96 itself is bounded by two substantially parallel metallic plates (walls) 100, 102 and two substantially parallel non-conducting walls (plates) 104, 106. An opening 108 into the channel 96 is provided at the end of the channel 96 opposite the non-conducting face plate 98. Additionally, for the operation of the inertial separator 18, a magnetic field 110 is established in the channel 96 by means well known to the skilled artisan. Specifically, the magnetic field 110 has a field strength which is preferably about one tenth of a Tesla (0.1 T), and the magnetic field 110 is oriented so as to be substantially parallel to the metallic plates (walls) 100, 102, and substantially perpendicular to the nonconducting walls 104, 106. Further, the inertial separator 18 includes an adjustable resistive element 112 which is connected between the metallic plates 100 and 102, and it has a series of baffles 114 which are aligned along the non-conducting wall 106 in a direction extending from the opening 108 toward the non-conducting face plate 98. It is to be appreciated that the baffles 114*a* and 114*b* shown in FIG. 6 are merely illustrative and that more baffles 114 can be used if desired.

Figure 7:
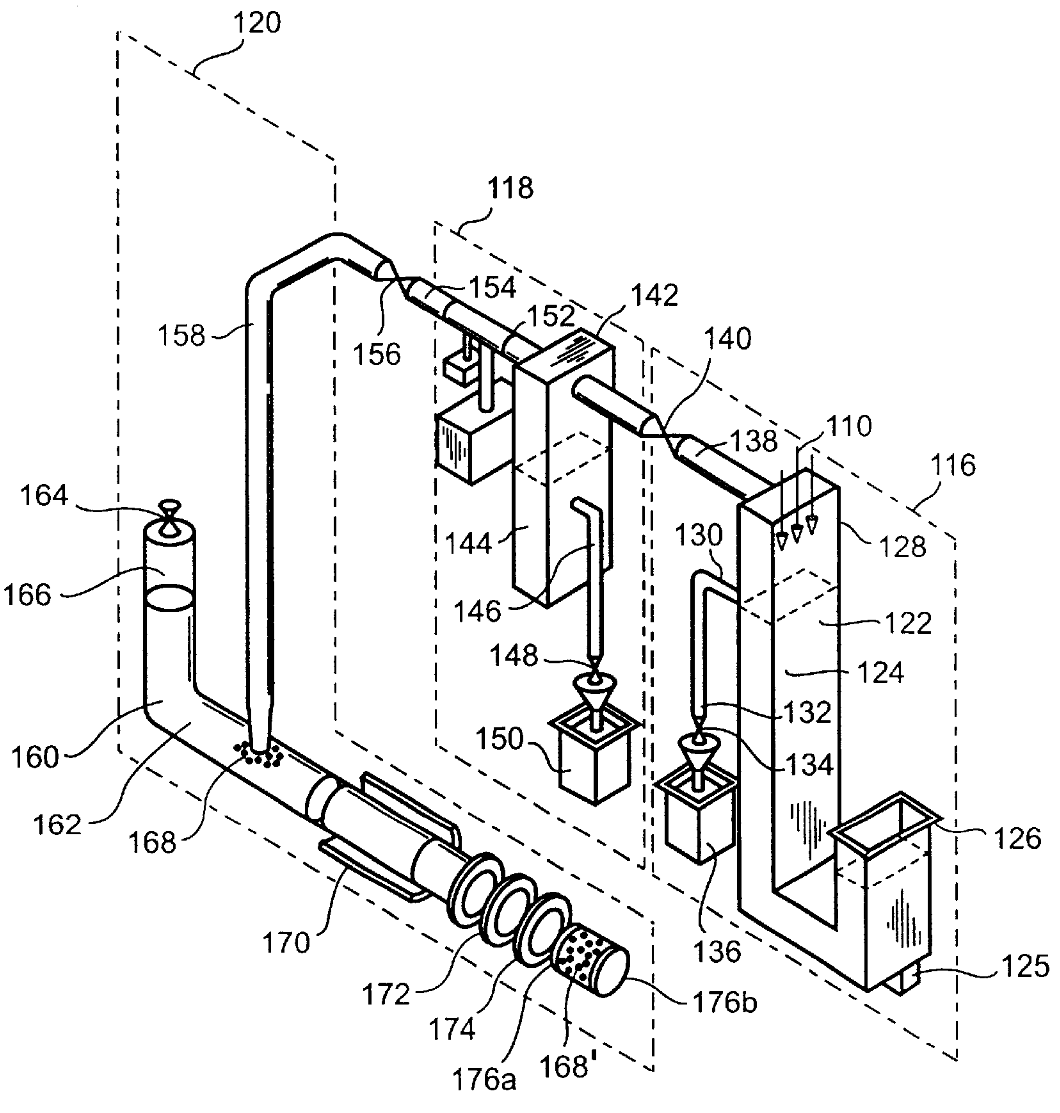
FIG. 7 is a perspective view of the collector/disposer sub-system of the system with portions broken away and portions shown in phantom for clarity.

In FIG. 7, the collector/disposer 20 of the system module 10 is shown to include three vitrification components. These components can be generally classified according to their operational pressures and, in this context are, a high vacuum (low pressure) vitrifier 116, an atmospheric vitrifier 118, and a high pressure vitrifier 120. Although all three of these components are required to effectively vitrify nuclear waste in the manner intended for the present invention, they handle different forms of the nuclear waste in different ways. Accordingly, in many respects, they can be considered as separate sub-systems.

The high vacuum (low pressure) vitrifier sub-system 116 includes a stainless steel manometer tube 122 which is filled with a molten glass 124 that is maintained in a molten state by external heaters 125. In a conventional manometer-like operation, the end 126 of the tube 122 is exposed to atmospheric pressure while the end 128 of tube 122 is exposed to the high vacuum environment established for the plasma processor 14 (i.e. a few μbars). It should be noted here that the end 128 of high vacuum vitrifier 116 is connected in fluid communication with a baffle 114 of the inertial separator 18. Consequently, by way of example, the heavy ions from the multi-species plasma which are directed through the baffle 114*a* will enter the high vacuum vitrifier 116 and come in contact with the surface of molten glass 124. There, many of them will be absorbed.

Vitrified heavy ions in the molten glass 124 are siphoned from the manometer tube 122 through an exit tube 130. From the exit tube 130, they are then dropped through a shot tower 132 and into a rotary valve 134 where they are formed as glass beads. The resultant glass beads of vitrified heavy ions are then collected in a bin 136 for subsequent disposal. As implied above, this process will recover a significant portion of the heavy radioactive ions from the nuclear waste. Some heavy ions, however, for whatever reason, remain in a gaseous state. These ions are then passed through a horizontal tube 138 from the high vacuum vitrifier 116 to the atmospheric vitrifier 118.

The heavy ions which were not vitrified in the high vacuum vitrifier 116 are passed through a compressor 140 and into the atmospheric vitrifier 118 where they are now neutral vapors which are subjected to atmospheric pressure. The atmospheric vitrifier 118, as shown in FIG. 7, includes a tank 142 which is filled with a molten glass 144. This vitrifier 118 is much like the vitrifier 116 in that it also has a shot tower 146 through which vitrified heavy elements in molten glass 144 pass on their way to a rotary valve 148. At the rotary valve 148 the vitrified heavy ions are formed as glass beads and collected in a bin 150 for subsequent disposal. The overall operation of vitrifier 118 is somewhat different than that of vitrifier 116 in that an acoustic absorber 152 is used to isolate the particulates that may form, and remove them from the stream for absorption in the molten glass 144. Still, it can happen that some radioactive gases may not have yet been vitrified. These gases are then passed via a tube 154 into the high pressure vitrifier 120.

High pressure vitrifier 120 includes a compressor 156 which compresses the gases that are received from atmospheric vitrifier 118 to thereby elevate these gases to pressures which are above atmospheric. Under these increased pressures, the gases are passed through the vertical leg 158 to a collection pipe 160. As shown in FIG. 7, the collection pipe 160 is substantially filled with a molten glass 162. Also, a compressor 164 is provided to vary pressure in the airspace 166 so that elevated pressures in the airspace 166 can be generated to move the molten glass 162 through the collection pipe 160 at preselected transition rates. In concert with the movement of the molten glass 162 through collection pipe 160, the gases from vertical leg 158 can be injected into the molten glass 162 as bubbles 168.

FIG. 7 also shows that the high pressure vitrifier 120 includes, in-line and downstream from the point where the bubbles 168 are created, a cooling unit which solidifies the molten glass 162 with entrapped bubbles 168 and a sensor unit which is capable of differentiating clear glass from glass having entrapped bubbles 168. A cutter 174 is then provided to cut through portions where there is clear glass to create glass cylinders of entrapped bubbles 168 which are capped between respective gaps 176*a* and 176*b*.

OPERATION

In the operation of the system of the present invention a canister 32 containing nuclear waste is first lowered through the entry vestibule 28 and down the leg 34 of loader/transporter 12 in the direction of arrow 178. As this is accomplished, the canister 32 is submerged into the transport medium 54. Once the canister 32 is in the horizontal passageway 36, and still submerged in the medium 54, it rolls along the rollers 44 and down the slope of angle $\alpha$ toward the end 40 of passageway 36 where it is punctured by the punch 48. This releases volatiles from the canister 32 which are then collected and held in the holding tank 50. After the canister 32 has been punctured, it is raised by the elevator 52 through the medium 54 in the direction of arrow 180. At the top of vertical leg 42, the canister 32' emerges from the transport medium 54 into the chute 60. It then rolls down the slope of chute 60 at the angle $\theta$ on the rollers 62. The canister 32" is now positioned in chute 60 at the insertion point 66. Recall, the pressure in chute 60 is established at a high vacuum of approximately only a few $\mu$bars prior to the arrival of the canister 32 at the insertion point 66. Additionally, also before the canister 32 arrives at the insertion point 66, the solenoid magnet 84 is energized to establish a magnetic field of approximately 0.1 Tesla in the plasma processor 14. As indicated above this magnetic field is generally axially aligned in the plasma processor 14 in the directions indicated by arrows 182 and 184.

Once canister 32 is at the insertion point 66, volatiles (i.e. volatile gases) from the holding tank 50 are released into the plasma chamber 72 where they are ionized by the rf antenna 82. As the volatiles are ionized they travel along the magnetic lines toward the canister 32 at the insertion point 66 and vaporize the canister 32 along with its contents. Because the contents of canister 32 will not typically be known, the resultant vapors will include many elements. In any event, after the contents and canister 32 are vaporized, the vapors proceed back along the magnetic field lines to the plasma chamber 72. At this point, operation of the rf antenna 82 at the helicon frequency (whistler mode) ionizes the vapors into a multi-species plasma. Included in this multi-species plasma will be the positive ions of many different elements. Some of these will be radioactive, and some will not be radioactive. As indicated above, the radioactive elements typically have the higher atomic weights and, based on this distinction, the "heavy ions" will need to be separated and segregated from the non-radioactive "light ions". Importantly, the density of the multi-species plasma in the plasma chamber 72 is maintained at the collisional density of the plasma so that, while in the plasma chamber 72, both the "heavy ions" and the "light ions" will have substantially the same velocity.

As the multi-species plasma exits the plasma chamber 72 through the magnetic nozzle 16, the ions in the plasma are uniformly accelerated into a fluid stream in which all ions maintain substantially the same velocity. This acceleration is accomplished both by the magnet 84, and by the expansion effect of tapered section 86. This fluid stream is directed out of the nozzle 16 and toward the inertial separator 18 in a direction generally indicated by the arrow 186. It should also be noted that the magnitude of the magnetic field in the nozzle 16 decreases significantly in the direction of arrow 186. For example, the field strength at the exit of plasma processor 14 and the entrance of the nozzle 16 may be approximately one thousand gauss. On the other hand, at the exit of nozzle 16 and entrance to the inertial separator 18 the field strength will have dropped to approximately ten gauss.

It is in the inertial separator 18 where the "heavy ions" are separated and segregated from the "light ions". For example, as the fluid stream of the multi-species plasma enters the opening 108 of the inertial separator 18, it encounters the magnetic field 110. The first recognized effect of the magnetic field 110 will be that electrons in the plasma will effectively be prevented from entering the channel 96. Then, due to the magnetic field 110, the positive ions in the multi-species plasma will begin to decelerate. Due to well known physics, the lighter ions will decelerate more rapidly than will the heavier ions. Consequently, the heavier ions will travel farther than the lighter ions. In fact, the distance traveled by each ion will be a direct function of its atomic weight. The result is that the "heavy ions" in the fluid stream are separated and segregated from the "light ions". It happens that the amount of separation between "heavy ions" and "light ions" can be controlled, at least to some extent, by the adjustable resistive element 112. For the embodiment of the present invention shown in FIG. 6, the "heavy ions" will travel the farthest into the channel 96 and then fall under the guidance of magnetic field 110 into the baffle 114*a*. At the same time, the "light ions" will travel a shorter distance and, also under the influence of magnetic field 110, fall into the baffle 114*b*. As indicated above, in this manner essentially all of the radioactive elements (i.e. "heavy ions") will be separated from the other elements in the nuclear waste of canister 32.

As the "heavy ions" from inertial separator 18 fall through the baffle 114*a*, and into the high vacuum vitrifier 116, many of them will come into contact with the molten glass 124 in manometer tube 122 and become vitrified. These vitrified "heavy ions" are then siphoned from manometer tube 122 via exit tube 130 and shot tower 132 and collected as glass beads in the collector bin 136. The "heavy ions" which, for whatever reason, are not absorbed by the molten glass 124 in high vacuum vitrifier 116 are passed to the atmospheric vitrifier 118. In the vitrifier 118, particulates of the heavy elements are isolated and removed from the stream by the Oseen effect of the acoustic absorber 152. These particulates of the heavy elements are vitrified in molten glass 144 and converted into glass beads for collection in the bin 150. Any gases or particulates of the heavy elements which were not previously vitrified in either the high vacuum vitrifier 116 or the atmospheric vitrifier 118 are passed to the high pressure vitrifier 120.

In the high pressure vitrifier 120, gases of the heavy elements are injected as bubbles 168 under pressure into the molten glass 162 in collection pipe 160. Periodically, the bubbling is stopped and the compressor 164 is activated to increase pressure in the airspace 166. This causes portions of the molten glass 162 to be clear of bubbles 168. Accordingly, as the molten glass 162 is pushed through the collection pipe 160 and cooled by the cooling unit 170, there will be alternating portions of clear glass and portions of contaminated glass containing embedded bubbles 168. The sensor 172 is able to distinguish between the clear glass and the bubbles 168 and a cutter 174 can be used to cut trough the portions of clear glass at the gaps 176 to entrap the bubbles 168 in glass cylinders for subsequent disposal.

While the particular nuclear waste separator as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A device for separating waste into light elements and heavy elements which comprises:

a means for transporting the waste into a high vacuum environment;

a means for vaporizing the waste to create a waste vapor;

a means for ionizing the waste vapor to create a multi-species plasma containing electrons, and ions of light elements and heavy elements;

a means for converting the multi-species plasma into a fluid stream, said converting means configured to accelerate the light ions and the heavy ions to all have a substantially uniform velocity; and a means for simultaneously decelerating the light ions and the heavy ions, said means for deceleration configured to decelerate the light ions more rapidly than the heavy ions to segregate the light ions and the heavy ions.

2. A device as recited in claim 1 further comprising a means for vitrifying the segregated ions.

3. A device as recited in claim 1 wherein said deceleration means comprises a magnetic field oriented substantially perpendicular to said fluid stream.

4. A device as recited in claim 1 wherein said ionizing means is a radio frequency (rf) antenna activated to excite the waste vapor with a Whistler mode.

5. A device for separating a mixture of material into light elements and heavy elements which comprises:

a means for creating a multi-species plasma including light ions and heavy ions of said respective light elements and heavy elements, said creating means configured to direct said light ions and said heavy ions to travel in a common direction along substantially linear paths into a region; and a means for orienting crossed electric and magnetic fields in said region to influence said light ions and heavy ions by altering the paths of said light ions and said heavy ions according to their respective masses to separate said light elements from said heavy elements.

6. A device as recited in claim 5 wherein said means for creating said multi-species plasma comprises:

a means for vaporizing the mixture to create a waste vapor;

a means for ionizing the waste vapor to create the multi-species plasma.

7. A. A device as recited in claim 6 wherein said ionizing means is a radio frequency (rf) antenna activated to excite the waste vapor with a Whistler mode.

8. A device as recited in claim 5 further comprising a first means for collecting said light elements and a second means for collecting said heavy elements.

9. A device as recited in claim 5 wherein the multi-species plasma has a density less than the collisional density of said ions in the multi-species plasma.

10. A material separator which comprises:

a means for converting a multi-species plasma containing electrons, ions of light elements and ions of heavy elements into a fluid stream, said converting means configured to accelerate said light ions and said heavy ions to all have a substantially uniform velocity, and for directing said light ions and said heavy ions for travel into a region along respective paths;

a means for orienting crossed electric and magnetic fields in said region to generate electromotive forces on said ions of light elements and said ions of heavy elements in said region, and to alter said paths of said ions of light elements and said ions of heavy elements according to the respective masses of said ions of light elements and said ions of heavy elements; and a means for influencing the electromotive forces to enhance alteration of said paths in said region.

11. A separator as recited in claim 10 wherein said influencing means adjusts a magnitude for said crossed electric and magnetic fields.

12. A separator as recited in claim 10 further comprising:

a means for vaporizing the material to create a waste vapor;

a means for ionizing the waste vapor to create the multi-species plasma.

13. A separator as recited in claim 12 wherein said ionizing means is a radio frequency (rf) antenna activated to excite the waste vapor with a Whistler mode.

14. A separator as recited in claim 10 wherein said separator further comprises a first means for collecting said ions of light elements and a second means for collecting said ions of heavy elements.

15. A separator as recited in claim 14 wherein the multi-species plasma has a density less than the collisional density of said ions in the multi-species plasma.

* * * * *

UNITED STATES PATENT AND TRADEMARK OFFICE

CERTIFICATE OF CORRECTION

PATENT NO. : 6,235,250 B1
DATED : May 22, 2001
INVENTOR(S) : Tihiro Ohkawa

It is certified that error appears in the above-identified patent and that said Letters Patent is hereby corrected as shown below:

<u>Column 2,</u>
Line 27, delete [$A \leq 70$] insert -- $A \geq 70$ --

<u>Column 3,</u>
Line 43, delete [A]

<u>Column 6,</u>
Line 54, delete [a] insert -- $\propto$ --

<u>Column 12,</u>
Line 23, delete [A.]

Signed and Sealed this

Sixteenth Day of October, 2001

*Attest:*

NICHOLAS P. GODICI

*Attesting Officer*

*Acting Director of the United States Patent and Trademark Office*